(12) United States Patent
Jordan, IV et al.

(10) Patent No.: US 6,495,727 B1
(45) Date of Patent: Dec. 17, 2002

(54) PROCESS FOR PREPARING ETHER-CAPPED POLY(OXYALKYLATED) ALCOHOL SURFACTANTS

(75) Inventors: Glenn Thomas Jordan, IV, Indian Spring, OH (US); Larry Eugene Miller, Cincinnati, OH (US); Donald Eugene Levengood, West Chester, OH (US); Mark Robert Sivik, Ft. Mitchell, KY (US); Bernard William Kluesener, Harrison, OH (US); Terry Franklin Formyduval, Cincinnati, OH (US); Deborah Jean Back, Cleves, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/831,117

(22) PCT Filed: Nov. 3, 1999

(86) PCT No.: PCT/US99/25943

§ 371 (c)(1),
(2), (4) Date: May 4, 2001

(87) PCT Pub. No.: WO00/27516

PCT Pub. Date: May 18, 2000

Related U.S. Application Data

(60) Provisional application No. 60/107,170, filed on Nov. 5, 1998, and provisional application No. 60/131,410, filed on Apr. 28, 1999.

(51) Int. Cl.[7] .......................... C07C 43/11; C07C 43/18; C07C 43/20
(52) U.S. Cl. .......................... 568/618; 568/616; 568/622
(58) Field of Search .................. 568/618, 622, 568/608, 616

(56) References Cited

U.S. PATENT DOCUMENTS

| | | | |
|---|---|---|---|
| 4,248,729 A | 2/1981 | Rubingh et al. | |
| 4,272,394 A | 6/1981 | Kaneko | |
| 4,284,532 A | 8/1981 | Leikhim et al. | |
| 4,627,927 A | 12/1986 | Sakatani et al. | |
| 4,770,815 A | 9/1988 | Baker et al. | |
| 4,790,856 A | 12/1988 | Wixon | |
| 4,804,492 A | 2/1989 | Bernarducci | |
| 4,978,805 A | 12/1990 | Baur et al. | |
| 5,035,814 A | 7/1991 | Maaser | |
| 5,047,165 A | 9/1991 | Lysy et al. | |
| 5,073,286 A | * 12/1991 | Otten et al. | ............ 252/97 |
| 5,294,365 A | * 3/1994 | Welch et al. | ........ 252/174.21 |
| 5,419,853 A | 5/1995 | Kemen | |

FOREIGN PATENT DOCUMENTS

| | | |
|---|---|---|
| DE | 2 225 318 | 12/1973 |
| EP | 0 342 177 B1 | 11/1989 |
| GB | 2144763 A | 3/1985 |
| GB | 2154599 A | 9/1985 |
| WO | WO 92/06150 A1 | 4/1992 |
| WO | WO 93/04153 A1 | 3/1993 |
| WO | WO 94/22800 A1 | 10/1994 |
| WO | WO 97/22651 A1 | 6/1997 |
| WO | WO 98/11185 A1 | 3/1998 |
| WO | WO 99/06466 A1 | 2/1999 |
| WO | WO 99/06467 A1 | 2/1999 |
| WO | WO 99/06468 A1 | 2/1999 |

OTHER PUBLICATIONS

Condon, B.D., "Glyceryl Bisether Sulfates. 1:Improved Synthesis"; J. Amer. Chem. Soc., vol. 71, No. 7 pp. 738–741 (Jul. 1994).

* cited by examiner

Primary Examiner—Samuel Barts
Assistant Examiner—Elvis O. Price
(74) Attorney, Agent, or Firm—Kevin L. Waugh; C. Brant Cook; Kim W. Zerby

(57) ABSTRACT

A process for preparing an ether-capped poly(oxyalkylated) alcohol surfactant having the formula $$R^1O[CH_2CH(R^3)O]_xCH_2CH(OH)CH_2OR^2$$

wherein $R^1$ and $R^2$ are linear or branched, saturated or unsaturated, aliphatic or aromatic hydrocarbon radicals having from 1 to about 30 carbon atoms; $R^3$ is H, or a linear aliphatic hydrocarbon radical having from 1 to about 4 carbon atoms; x is an integer having an average value from 1 to about 30, wherein when x is about 2 or greater $R^3$ may be the same or different; further wherein when x is about 15 or greater and $R^3$ is H and methyl, at least four of $R^3$ are methyl, further wherein when x is about 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butoxy and mixtures thereof; said process comprising the steps of:

(b) providing a glycidyl ether having the formula:

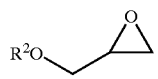

wherein $R^2$ is defined as above;
(c) providing an ethoxylated alcohol having the formula:

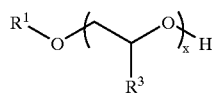

wherein $R^1$, $R^3$ and x are defined as above;
(f) reacting said glycidyl ether with said ethoxylated alcohol to form said surfactant in the presence of a basic catalyst;
(g) said surfactant is sparged with an inert gas, preferably $N_2$, Ar and mixtures thereof, optionally under vacuum, preferably a vacuum in the range of 5 to 500 mmHg; and
said surfactant is bleached with an about 0.05% to about 5.0%, preferably about 0.1% to about 1.0%, by weight solution of a bleach at a temperature from about 25° C. to about 95° C.

21 Claims, No Drawings

PROCESS FOR PREPARING ETHER-CAPPED POLY(OXYALKYLATED) ALCOHOL SURFACTANTS

This application claims the benefit of provisional applications No. 60/131,410, filed Apr. 28, 1999 and 60/107,170, filed Nov. 5, 1998.

TECHNICAL FIELD

The present invention relates to an industrial process for preparing low-foaming nonionic surfactants and more particularly to a process for preparing ether-capped poly(oxyalkylated) alcohol surfactants which have superior spotting and filming benefits in dishwashing and hard surface cleaning applications, as well as suds suppression in detergent compositions.

BACKGROUND OF THE INVENTION

Ether-capped poly(oxyalkylated) alcohols can be prepared using various catalysts, such as Lewis acids. However, for industrial production, metallic catalysts, such as stannic chloride is preferred. In addition to being an excellent catalyst for the reaction of a glycidyl ether with ethoxylated alcohol, metallic catalysts are economical and readily available in commercial bulk quantities. They also offer safety and ease of handling advantages on an industrial scale versus alternative catalysts. One important disadvantage for metallic catalysts is that the soluble metallic residue component of the catalyst, such as tin residues when is the catalyst $SnCl_4$, resulting from there use as reaction catalyst, generally cannot be tolerated above about 100 ppm in many cleaning formulations and applications and these residues are difficult and expensive to remove from ether-capped poly(oxyalkylated) alcohol compositions. Successful laboratory approaches to removal of residual metallic catalyst component, such as the use of a silica gel plug and eluting with a 5% methanol in dichloromethane solution leads to complexity and high cost on an industrial production scale. Due to the surfactant properties of the ether-capped poly(oxyalkylated) alcohol, water washing for metallic catalyst component removal leads to emulsification problems leading to complex organic—aqueous separations.

Problems can also arise in the formation of color impurities, caused by the reaction of color forming bodies, in the end product. These color forming impurities or bodies result in a finished product which is undesirable to consumers and consequently unusable because of its appearance. Thus, the synthesis of ether-capped poly(oxyalkylated) alcohol surfactants is not straightforward and can be surprisingly problematic.

Accordingly, the need remains for a simple, inexpensive yet effective process for the production of ether-capped poly(oxyalkylated) alcohol surfactants which does not result in colored impurities in the final product.

BACKGROUND ART

U.S. Pat. Nos. 4,272,394, issued Jun. 9, 1981, 5,294,365, issued Mar. 15, 1994, 4,248,729, issued Feb. 3, 1981; 4,284,532, issued Aug. 18, 1981; 4,627,927, issued Dec. 9, 1986; 4,790,856, issued Dec. 13, 1988; 4,804,492, issued Feb. 14, 1989; 4,770,815, issued Sep. 13, 1989; 5,035,814, issued Jul. 30, 1991; 5,047,165, issued Sep. 10, 1991; 5,419,853, issued May 30, 1995; 5,294,365, issued Mar. 15, 1994; GB Application No. 2,144,763, published Mar. 13, 1985; GB Application No. 2,154,599, published Sep. 9, 1985; WO Application No. 9,296,150, published Apr. 16, 1992; WO 94/22800, published Oct. 13, 1994, WO 93/04153, published Mar. 4, 1993, WO 97/22651, published Jun. 26, 1997, EP Application No. 342,177, published Nov. 15, 1989 and "Glyceryl Bisether Sulfates. 1: Improved Synthesis" Brian D. Condon; Journal Of the American Chemical Society, Vol. 71, no. 7 (July 1994).

SUMMARY OF THE INVENTION

A process for production of ether-capped poly(oxyalkylated) alcohol surfactants which does not result in colored impurities in the final product has been discovered that is simple and economical to practice on an industrial scale. It has been discovered that the use of a basic catalysts, such as Lewis bases, and then following the reaction with a bleaching step can be used to produce poly(oxyalkylated) alcohol surfactants which does not result in colored impurities while avoiding oil and water phase emulsification during work-up and product isolation. This method avoids organic solvents, costly process aids, process complexity and removes the need to remove any metallic catalyst component residues, typically associated with the use of Lewis acid catalysts. This bleaching can be carried out as either a batch or continuous process. Furthermore, the bleached product can be removed in a single or multiple extraction steps.

In accordance with a first aspect of the present invention, a process for preparing an ether-capped poly(oxyalkylated) alcohol surfactant is provided. The surfactant has the formula:

wherein $R^1$ and $R^2$ are linear or branched, saturated or unsaturated, aliphatic or aromatic hydrocarbon radicals having from about 1 to about 30 carbon atoms; $R^3$ is H, or a linear aliphatic hydrocarbon radical having from about 1 to about 4 carbon atoms; x is an integer having an average value from 1 to about 30, wherein when x is 2 or greater, $R^3$ may be the same or different, independently H, or $C_1$ to $C_4$ in any given molecule, further wherein when x is 15 or greater and $R^3$ is H and methyl, at least four of $R^3$ are methyl, further wherein when x is 15 or greater and $R^3$ includes H and from 1 to 3 methyl groups, then at least one $R^3$ is ethyl, propyl or butyl, further wherein $R^2$ can optionally be alkoxylated, wherein said alkoxy is selected from ethoxy, propoxy, butyloxy and mixtures thereof. The process comprises the steps of:

(a) providing a glycidyl ether having the formula:

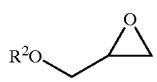

wherein $R^2$ is defined as above;

(b) providing an ethoxylated alcohol having the formula:

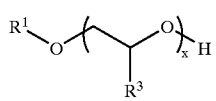

wherein $R^1$, $R^3$ and x are defined as above; and (c) reacting the glycidyl ether with the ethoxylated alcohol to form the surfactant in the presence of a basic catalyst;

(d) optionally, said surfactant is sparged with an inert gas, preferably N$_2$, Ar and mixtures thereof, optionally under vacuum, preferably a vacuum in the range of 5 to 500 mmHg; and (e) the product of step (d) is bleached with an about 0.05% to about 5.0%, preferably about 0.1% to about 1.0%, by weight solution of a bleach at a temperature from about 25° C. to about 95° C.

R$^1$ and R$^2$ are preferably a linear or branched, saturated or unsaturated, aliphatic hydrocarbon radical having from about 6 to about 22 carbon atoms and x is an integer having an average value of from about 6 to about 15.

The step of reacting the glycidyl ether with the ethoxylated alcohol is preferably conducted at a temperature of from about 95° C. to about 140° C. with 110° C. to 130° C. even more preferred when alkali metal alkoxylates are employed.

The step of providing the glycidyl ether may further comprises the step of reacting a linear aliphatic or aromatic alcohol having the formula R$^2$OH and an epoxide having the formula:

wherein R$^2$ is defined as above and X is a leaving group. This reaction may also be conducted in the presence of a catalyst as defined above. The catalyst is typically employed at levels about 0.1 mol % to about 2.0 mol % and the reaction is preferably conducted in the absence of a solvent at temperatures of from about 40° C. to about 90° C.

As already noted, the surfactants have advantages, including superior spotting and filming reduction benefits as well as excellent greasy soil removal, good dishcare, suds suppression and good overall cleaning.

Accordingly, it is an aspect of the present invention to provide a process for producing a low-foaming nonionic surfactant having superior spotting and filming reduction benefits as well as excellent greasy soil removal, good dishcare, suds suppression and good overall cleaning. It is a further aspect of the present invention to provide a process for producing an ether-capped poly(oxyalkylated) alcohol surfactant. It is a further aspect of the present invention to provide a low-foaming nonionic surfactant produced by the process of the present invention. These and other aspects, features and advantages will be apparent from the following description and the appended claims.

In the description of the invention various embodiments and/or individual features are disclosed. As will be apparent for the skilled practitioner all combinations of such embodiments and features are possible and can result in preferred executions of the invention.

All parts, percentages and ratios used herein are expressed as percent weight unless otherwise specified. All documents cited are, in relevant part, incorporated herein by reference.

DETAILED DESCRIPTION OF THE PREFERRED EMBODIMENTS

Once again, the present invention is directed toward a process for producing a low-foaming nonionic surfactant for use in detergent compositions.

The novel surfactants of the present invention comprise ether-capped poly(oxyalkylated) alcohols having the formula:

wherein R$^1$ and R$^2$ are linear or branched, saturated or unsaturated, aliphatic or aromatic hydrocarbon radicals having from about 1 to about 30 carbon atoms; R$^3$ is H, or a linear aliphatic hydrocarbon radical having from about 1 to about 4 carbon atoms; x is an integer having an average value from 1 to about 30, wherein when x is 2 or greater R$^3$ may be the same or different and k and j are integers having an average value of from about 1 to about 12, and more preferably 1 to about 5, further wherein when x is 15 or greater and R$^3$ is H and methyl, at least four of R$^3$ are methyl, further wherein when x is 15 or greater and R$^3$ includes H and from 1 to 3 methyl groups, the n at least one R$^3$ is ethyl, propyl or butyl, further wherein R2 can optionally be alkoxylated, wherein said alkoxy is selected from ethoxy, propoxy, butyloxy and mixtures thereof.

R$^1$ and R$^2$ are preferably linear or branched, saturated or unsaturated, aliphatic or aromatic hydrocarbon radicals having from about 6 to about 22 carbon atoms with about 8 to about 18 carbon atoms being most preferred. Additionally, R$^2$ may be selected from hydrocarbon radicals which are ethoxylated, propoxylated and/or butoxylated. H or a linear aliphatic hydrocarbon radical having from about 1 to about 2 carbon atoms is most preferred for R$^3$. Preferably, x is an integer having an average value of from about 1 to about 20, more preferably from about 6 to about 15.

As described above, when, in the preferred embodiments, and x is greater than 2, R$^3$ may be the same or different. That is, R$^3$ may vary between any of the alkyleneoxy units as described above. For instance, if x is 3, R$^3$ may be selected to form ethyleneoxy (EO) or propyleneoxy (PO) and may vary in order of (EO)(PO)(EO), (EO)(EO)(PO); (EO)(EO)(EO); (PO)(EO)(PO); (PO)(PO)(EO) and (PO)(PO)(PO). Of course, the integer three is chosen for example only and the variation may be much larger with a higher integer value for x and include, for example, multiple (EO) units and a much small number of (PO) units. However, when x is 15 or greater and R$^3$ is H and methyl, at least four of R$^3$ are methyl, further wherein when x is 15 or greater and R$^3$ includes H and from 1 to 3 methyl groups, then at least one R$^3$ is ethyl, propyl or butyl.

Particularly preferred surfactants as described above include those that have a low cloud point of less than about 20° C. These low cloud point surfactants may then be employed in conjunction with a high cloud point surfactant as described in detail below for superior grease cleaning benefits.

Most preferred according to the present invention are those surfactants wherein k is 1 and j is 1 so that the surfactants have the formula:

where R$^1$, R$^2$ and R$^3$ are defined as above and x is an integer with an average value of from about 1 to about 30, preferably from about 1 to about 20, and even more preferably from about 6 to about 18. Most preferred are surfactants wherein R$^1$ and R$^2$ range from about 9 to about 15, R$^3$ is H forming ethyleneoxy and x ranges from about 6 to about 15.

Basically, the alcohol surfactants of the present invention comprise three general components, namely a linear or branched alcohol, an alkylene oxide and an alkyl ether end cap. The alkyl ether end cap and the alcohol serve as a hydrophobic, oil-soluble portion of the molecule while the alkylene oxide group forms the hydrophilic, water-soluble portion of the molecule.

It has been surprisingly discovered in accordance with the present invention that significant improvements in spotting and filming characteristics and, when used in conjunction with high cloud point surfactants, in the removal of greasy soils relative to conventional surfactants, are provided via the ether-capped poly(oxyalkylene) alcohol surfactants of the present invention.

It has been surprisingly discovered that the ether-capped poly(oxyalkylene) alcohol surfactants of the present invention in addition to delivering superior cleaning benefits also provide good suds control. This suds control can be clearly seen in the presence of high sudsing surfactants, such as amine oxides, or in the presence of high sudsing soils, such as proteinaceous or egg soils.

Generally speaking, the ether-capped poly(oxyalkylene) alcohol surfactants of the present invention may be produced by reacting an aliphatic alcohol with an epoxide to form an ether which is then reacted with a base to form a second epoxide. The second epoxide is then reacted with an alkoxylated alcohol to form the ether-capped poly(oxyalkylene) alcohol surfactants of the present invention. The product of the process is a purified mixture of ether-capped poly (oxyalkylene) alcohol surfactants.

The process comprises the first step of providing a glycidyl ether having the formula:

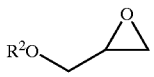

where $R^2$ is defined as above. Various glycidyl ethers are available from a number of commercial sources including the Aldrich Chemical Company. Alternatively, the glycidyl ether may be formed from the reaction of a linear or branched, aliphatic or aromatic alcohol of the formula $R^2OH$ where $R^2$ is defined as above and an epoxide of the formula:

where X is a suitable leaving group. While a number of leaving groups may be employed in the present invention, X is preferably selected from the group consisting of halides including chloride, bromide, and iodide, tosylate, mesylate and brosylate, with chloride and bromide being even more preferred with chloride being the most preferred (e.g. epichlorohydrin).

The linear or branched alcohol and the epoxide are preferably reacted at ratios ranging from about 0.5 equivalents alcohol to 2.5 equivalents epoxide with 0.95 equivalents alcohol to 1.05 equivalents epoxide more typical. The catalyst is a basic catalyst. The term "basic catalyst", includes within its definition catalysts which are basic. This definition includes both salts, such as KOH, KO$^t$BU, NaOEt, etc., covalent compounds, and elements, such as metallic sodium.

Suitable catalysts include, but are not limited to, alkali metal alkoxylates, such as KO$^t$Bu, NaOEt, KOEt, NaOMe and mixtures thereof; NaOH, KOH, CaO, Na and mixtures thereof, more preferably alkali metal alkoxylates. The basic catalyst is preferably a Lewis base. Suitable Lewis base catalysts include, but are not limited to, KOH, NaOCH$_3$, NaOC$_2$H$_5$, KO$^t$Bu, NaOH and mixtures thereof. The Lewis base catalysts are preferably employed at amounts of about 0.1 mol % to about 2.0 mol % with about 0.2 mol % to about 1.0 mol % being more typical. The alkali metal alkoxylate catalysts are preferably employed at amounts of about 2.0 mol % to about 20.0 mol % with about 5.0 mol % to about 15.0 mol % being more typical.

While the reaction may be conducted in the presence of a suitable solvent such as benzene, toluene, dichloromethane, tetrahydrofuran, diethylether, methyl tert-butylether or the like, the reaction is preferably conducted neat or in the absence of solvent. When the basic catalyst is an alkali metal hydroxide, it is preferred to include some trace water (typically deionised water), typically less than about 5%, more preferably about 0.2% to about 3%, even more preferably about 0.2% to about 2%, by weight of the reaction mixture. While not wishing to be limited by theory, it is believed that the water aids in the mobility of the hydroxide ions and hence increases the speed of the reaction.

Lastly, the reaction is conducted at temperatures preferably ranging from about 40° C. to about 90° C., more preferably from about 50° C. to about 80° C.

The surfactant may be optionally either sparged with an inert gas, preferably, nitrogen, argon or mixtures thereof or placed under a vacuum, to remove any volatile impurities which were formed during the reaction. It is further preferred that the sparging is performed under a vacuum, preferably a vacuum in the range of 5 to 500 mmHg. It is further preferred that the sparging is performed for at least 30 minutes, more preferably at least 90 minutes. It is further preferred that the sparging is performed at a temperature of about 50° C. to about 100° C., more preferably at a temperature of 60° C. to about 70° C.

The bleaching step of the present invention may use a bleach or oxidizing agents such as, an oxygen bleach, more preferably hydrogen peroxide, or sodium hypochlorite. It is preferred that any bleach be used at from about 0.05% to about 5.0%, more preferably from about 0.1 to about 1.0 wt % at a temperature from 25° C. to 95° C. to bleach the resulting reaction product.

To form the surfactant, an ethoxylated alcohol having the formula:

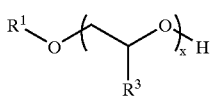

wherein $R^1$ and x are defined as before in an amount of from about 0.80 to about 2.0 equivalents is combined with the basic catalyst and heated to a temperature ranging from about 50° C. to about 95° C. and more preferably from about 90° C. to about 140° C. and more preferably from about 110° C. to about 130° C. when an alkali metal alkoxylate catalyst is employed. The glycidyl ether is then added to the mixture and reacted for from about 0.5 hours to about 30 hours, more preferably from about 1 hour to about 24 hours.

A further surprising advantage of the present invention is that the use of a basic catalyst avoids the formation of oxygenated impurities which are typically associated with any ethoxylation processes, such as ethanol, ethylene glycol, diethylene glycol, etc. This eliminates any steps necessary to eliminate the removal of these products.

A representative synthetic route is demonstrated via the following diagram and examples.

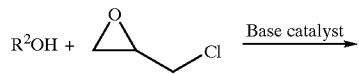

-continued $$R^2O\text{-}\triangle\text{-O} + R^1\text{-}O\text{-}(\text{-O-CH}_2\text{-CHR}^3\text{-O-})_x\text{H} \xrightarrow{\text{Base catalyst}}$$

$$R^2\text{-O-CH}_2\text{-CH(OH)-CH}_2\text{-O-}(\text{-CHR}^3\text{-CH}_2\text{-O-})_x R^1$$

EXAMPLES

Example 1

Neodol 25-12 (390.5 g, 0.538 mol) is melted and added into a one liter four-necked round bottomed flask fitted with a condenser, nitrogen inlet, addition funnel, mechanical stirrer and internal thermometer. A nitrogen atmosphere is established. The contents of the flask are heated to 120° C. whereupon KOH (10.4 g, 87% assay premixed mixed with 10.4 g water) is added and dissolved. Then C12/14-alkylglycidyl ether (276.1 g, 1.08 mol) is added dropwise over a period of 20 minutes. The reactor contents are maintained at 120° C. for six hours to complete the reaction. The reactor is then cooled to 80° C. The reaction product is an amber color with a Gardner color of 2.150 g of the reaction product is transferred to a 500 ml beaker. The liquid is maintained at 80° C. using a hot plate with a magnetic stir bar for mixing. Hydrogen peroxide (1.5 g of a 49% solution) is added to the beaker and cooling is initiate. The liquid color lightens quickly and to pale yellow with a Gardner color of <1.

Example 2

As for Example 1 except C11/13-alkylglycidyl ether (261.8 g, 1.08 mol) is used, and KOEt (13.6 g) is the catalyst, with no additional water present. The reaction product after bleaching has a gardener color of about 1.

Example 3

As for Example 1 except C13/15-alkylglycidyl ether (292.1 g, 1.08 mol) is used, and Na (3.7 g) is the catalyst, with no additional water present. The reaction product after bleaching has a gardener color of less than about 1.

From the aforementioned surfactants, a cleaning composition, and in particular, a dish or hard surface cleaning composition may be designed. The compositions can optionally include one or more other detergent adjunct materials or other materials for assisting or enhancing cleaning performance, treatment of the substrate to be cleaned, or to modify the aesthetics of the detergent composition (e.g., perfumes, colorants, dyes, etc.). The following are illustrative examples of such adjunct materials.

Detersive ingredients or adjuncts optionally included in the instant compositions can include one or more materials for assisting or enhancing cleaning performance, treatment of the substrate to be cleaned, or designed to improve the aesthetics of the compositions. Adjuncts which can also be included in compositions of the present invention, at their conventional art-established levels for use (generally, adjunct materials comprise, in total, from about 30% to about 99.9%, preferably from about 70% to about 95%, by weight of the compositions), include other active ingredients such as phosphate and non-phosphate builders, chelants, enzymes, dispersant polymers (e.g., from BASF Corp. or Rohm & Haas), color speckles, silvercare, anti-tarnish and/or anti-corrosion agents, silicates, dyes, fillers, germicides, alkalinity sources, hydrotropes, anti-oxidants, enzyme stabilizing agents, perfumes, solubilizing agents, carriers, processing aids, pigments, and pH control agents.

Depending on whether a greater or lesser degree of compactness is required, filler materials can also be present in the instant compositions. These include sucrose, sucrose esters, sodium sulfate, potassium sulfate, etc., in amounts up to about 70%, preferably from 0% to about 40% of the composition. Preferred filler is sodium sulfate, especially in good grades having at most low levels of trace impurities.

Sodium sulfate used herein preferably has a purity sufficient to ensure it is non-reactive with bleach; it may also be treated with low levels of sequestrants, such as phosphonates or EDDS in magnesium-salt form. Note that preferences, in terms of purity sufficient to avoid decomposing bleach, applies also to pH-adjusting component ingredients, specifically including any silicates used herein.

The compositions of the invention can optionally contain an alkyl phosphate ester suds suppressor, a silicone suds suppressor, or combinations thereof Levels in general are from 0% to about 10%, preferably, from about 0.001% to about 5%. However, generally (for cost considerations and/or deposition) preferred compositions herein do not comprise suds suppressors, that is they are totally free of them, or comprise suds suppressors only at low levels, e.g., less than about 0.1% of active suds suppressing agent.

Hydrotrope materials such as sodium benzene sulfonate, sodium toluene sulfonate, sodium cumene sulfonate, etc., can be present, e.g., for better dispersing surfactant.

Bleach-stable perfumes (stable as to odor); and bleach-stable dyes such as those disclosed in U.S. Pat. No. 4,714,562, Roselle et al, issued Dec. 22, 1987 can also be added to the present compositions in appropriate amounts.

Since the compositions can contain water-sensitive ingredients or ingredients which can co-react when brought together in an aqueous environment, it is desirable to keep the free moisture content at a minimum, e.g., 7% or less, preferably 5% or less of the compositions; and to provide packaging which is substantially impermeable to water and carbon dioxide. Coating measures may be employed to protect the ingredients from each other and from air and moisture. Plastic bottles, including refillable or recyclable types, as well as conventional barrier cartons or boxes are another helpful means of assuring maximum shelf-storage stability. As noted, when ingredients are not highly compatible, it may further be desirable to coat at least one such ingredient with a low-foaming nonionic surfactant for protection. There are numerous waxy materials which can readily be used to form suitable coated particles of any such otherwise incompatible components; however, the formulator prefers those materials which do not have a marked tendency to deposit or form films on dishes including those of plastic construction.

The following nonlimiting examples further illustrate compositions of the present invention.

Example 4

An automatic dishwashing detergent composition is prepared as follows:

| Ingredients: | Weight % A | Weight % B |
|---|---|---|
| Sodium Tripolyphosphate (STPP) | 24.0 | 45 |
| Sodium carbonate | 20.0 | 13.5 |
| Hydrated 2.0r silicate | 15 | 13.5 |
| Nonionic surfactants[1] | 2.0 | 2.0 |
| Tergitol 15S9 Nonionic surfactant[2] | 1.0 | 1.0 |
| Polymer[3] | 4.0 | — |
| Protease (4% active) | 0.83 | 0.83 |
| Amylase (0.8% active) | 0.5 | 0.5 |
| Perborate monohydrate (15.5% Active AvO)[4] | 14.5 | 14.5 |
| Cobalt catalyst[5] | 0.008 | — |
| Water, sodium sulfate and misc. | Balance | Balance |

[1]Ether-capped poly(oxyalkylated) alcohol of EXAMPLE 1
[2]Ethoxylated secondary alcohol supplied by Union Carbide (cloud point 60° C.).
[3]Terpolymer selected from either 60% acrylic acid/20% maleic acid/20% ethyl acrylate, or 70% acrylic acid/10% maleic acid/20% ethyl acrylate.
[4]The AvO level of the above formula is 2.2%.
[5]Pentaamineacetatocobalt(III) nitrate.

The ADD's of the above dishwashing detergent composition examples may be used to wash lipstick-stained plastic and ceramic, tea-stained cups, starch-soiled and spaghetti-soiled dishes, milk-soiled glasses, starch, cheese, egg or babyfood-soiled flatware, and tomato-stained plastic spatulas by loading the soiled dishes in a domestic automatic dishwashing appliance and washing using either cold fill, 60° C. peak, or uniformly 45–50° C. wash cycles with a product concentration of the exemplary compositions of from about 1,000 to about 10,000 ppm, with excellent results.

The following examples further illustrate phosphate built ADD compositions which contain a bleach/enzyme particle, but are not intended to be limiting thereof. All percentages noted are by weight of the finished compositions, other than the perborate (monohydrate) component, which is listed as AvO.

Examples 5–6

| | 5 | 6 |
|---|---|---|
| Catalyst[1] | 0.008 | 0.004 |
| Savinase ™ 12T | — | 1.1 |
| Protease D | 0.9 | — |
| Duramyl ™ | 1.5 | 0.75 |
| STPP | 31.0 | 30.0 |
| Na₂CO₃ | 20.0 | 30.5 |
| Polymer[2] | 4.0 | — |
| Perborate (AvO) | 2.2 | 0.7 |
| Dibenzoyl Peroxide | 0.2 | 0.15 |
| 2 R Silicate (SiO₂) | 8.0 | 3.5 |
| Paraffin | 0.5 | 0.5 |
| Benzotriazole | 0.3 | 0.15 |
| Nonionic surfactant[3] | 1.0 | 1.0 |
| Sodium Sulfate, Moisture | -----Balance----- | |

[1]Pentaamineacetatocobalt (III) nitrate; may be replaced by MnTACN.
[2]Polyacrylate or Acusol 480N or Polyacrylate/polymethacrylate copolymers.
[3]A nonionic surfactant prepared according to EXAMPLE 2.

In Compositions of Examples 5 and 6, respectively, the catalyst and enzymes are introduced into the compositions as 200–2400 micron composite particles which are prepared by spray coating, fluidized bed granulation, marumarizing, prilling or flaking/grinding operations. If desired, the protease and amylase enzymes may be separately formed into their respective catalyst/enzyme composite particles, for reasons of stability, and these separate composites added to the compositions.

Examples 7–8

| | 7 | 8 |
|---|---|---|
| Composite Particle | 1.5 | 0.75 |
| Savinase ™ 12T | 2.2 | — |
| Protease D | — | 0.45 |
| STPP | 34.5 | 30.0 |
| Na₂CO₃ | 20.0 | 30.5 |
| Acusol 480N | 4.0 | — |
| Perborate(AvO) | 2.2 | 0.7 |
| 2 R Silicate(SiO₂) | 8.0 | 3.5 |
| Paraffin | — | 0.5 |
| Benzotriazole | — | 0.15 |
| Nonionic surfactant[1] | 1.0 | 1.0 |
| LF404[2] | 1.0 | 0.75 |
| Sodium Sulfate, Moisture | ---to balance---- | |

[1]Prepared according to EXAMPLE 3.
[2]A blend of ethoxylated/propoxylated nonionic surfactants available from BASF.

Example 9

Light-duty liquid dishwashing detergent formulae are prepared as follows:

| Ingredient | Composition % Weight A | Composition % Weight B | Composition % Weight C |
|---|---|---|---|
| Surfactant[1] | 1.00 | 2.00 | 1.50 |
| AES | 32.00 | 33.00 | 29.00 |
| Amine Oxide Surfactant | 5.00 | 4.50 | 6.00 |
| Betaine Surfactant | 3.00 | 5.00 | 1.75 |
| Perfume | 0.18 | 0.18 | 0.18 |
| Water and minors | ------Balance-------- | | |

[1]Prepared according to EXAMPLE 1

Example 10

An automatic dishwashing detergent tablet is prepared from the composition as follows:

| Ingredients: | Weight % A | Weight % B |
|---|---|---|
| Sodium Tripolyphosphate (STPP) | 50.0 | 47.0 |
| Sodium carbonate | 14.0 | 15 |
| Hydrated 2.0r silicate | 8.0 | 5.0 |
| Nonionic surfactant[1] | 0.4 | 2.0 |
| Tergitol 15S9 Nonionic surfactant[2] | 1.0 | 1.0 |
| Polymer[3] | 4.0 | — |
| Protease (4% active) | 2.0 | 1.50 |
| Amylase (0.8% active) | — | 0.5 |
| Perborate monohydrate (15.5% Active AvO)[4] | 1.5 | 1.5 |
| Cobalt catalyst[5] | 0.008 | — |
| TAED | — | 2.2 |
| Benzotriazole | 0.3 | — |

-continued

|  | Weight % | |
|---|---|---|
| Ingredients: | A | B |
| Paraffin Oil[6] | 0.5 | — |
| Water, sodium sulfate and misc. | Balance | Balance |

[1]Ether-capped poly(oxyalkylated) alcohol of EXAMPLE 2
[2]Ethoxylated secondary alcohol supplied by Union Carbide (cloud point = 60° C.).
[3]Polyacrylate polymer blended with HEDP.
[4]The AvO level of the above formula is 2.2%.
[5]Pentaamineacetatocobalt(III) nitrate.
[6]Winog 70 available from Wintershall, Salzbergen, Germany.

The ADD's of the above dishwashing detergent composition examples may be used to wash lipstick-stained plastic and ceramic, tea-stained cups, starch-soiled and spaghetti-soiled dishes, milk-soiled glasses, starch, cheese, egg or babyfood-soiled flatware, and tomato-stained plastic spatulas by loading the soiled dishes in a domestic automatic dishwashing appliance and washing using either cold fill, 60° C. peak, or uniformly 45–50° C. wash cycles with a product concentration of the exemplary compositions of from about 1,000 to about 10,000 ppm, with excellent results.

Example 11

A hard surface cleaning composition according to the present invention is illustrated as follows:

|  | Weight % | | | | | |
|---|---|---|---|---|---|---|
| Ingredients | A | B | C | D | E | F |
| Surfactant[1] | 0.25 | 3.5 | 5.5 | 6.5 | 6.1 | 9.5 |
| Sodium hypochlorite | 0.9 | 1.4 | 1.4 | — | — | — |
| Calcium hypochlorite | — | — | — | 0.5 | — | — |
| Sodium dichlorocyanurate | — | — | — | — | 1.2 | 2.0 |
| Tetrapotassium pyrophos. | 6.0 | — | — | — | 13.0 | — |
| Tripotassium phosphate | 2.0 | — | — | — | 12.0 | — |
| Sodium tripolyphosphate | — | — | — | 1.6 | — | — |
| Calcium carbonate | — | — | — | — | 39.0 | 1.1 |
| Calcium oxide | — | — | — | — | 2.8 | — |
| Perlite abrasive | 6.5 | — | — | — | 22.5 | 0.5 |
| Sodium hydroxide | 0.8 | 1.6 | 1.8 | 0.8 | 1.1 | 1.0 |
| Potassium hydroxide | — | — | — | 0.85 | — | — |
| Dyes | 0.75 | 0.28 | 0.28 | 0.28 | — | — |
| Lanolin | — | — | — | — | — | 2.1 |
| Carboxymethylcellulose | — | — | — | — | — | 2.6 |
| Water/Misc. | bal. | bal. | bal. | bal. | bal. | bal. |

[1]Ether-capped poly(oxyalkylated) alcohol or EXAMPLE 2.

Example 12

Liquid gel-like automatic dishwashing detergent compositions according to the present invention as prepared as followed:

|  | A | B |
|---|---|---|
| STPP builder | 17.5 | 16 |
| K carbonate | 8 | — |
| Na carbonate | — | 1.5 |
| K hydroxide | 2 | 2.0 |
| K silicate | 4 | 1.5 |
| Na silicate | 2 | 3 |

-continued

|  | A | B |
|---|---|---|
| thickener | 1 | 1 |
| Nitric acid | 0.02 | 0.02 |
| Al tristearate | 0.1 | — |
| polymer dispersant[2] | 0.5 | — |
| Na benzoate | 0.8 | 0.5 |
| Surfactant[1] | 1.0 | 2.0 |
| Perborate | | 2.2 |
| Na hypochlorite | 1.5 | — |
| Water and Minors | balance | balance |

[1]Ether-capped poly(oxyalkylated) alcohol of EXAMPLE 3
[2]sodium polyacrylate of 4500 m.w.

What is claimed is:

1. A process for preparing an ether-capped poly(oxyalkylated) alcohol surfactant having the formula $$R^1O[CH_2CH(R^3)O]_xCH_2CH(OH)CH_2OR^2$$

wherein $R^1$ and $R^2$ are linear or branched, saturated or unsaturated, aliphatic or aromatic hydrocarbon radicals having from 1 to about 30 carbon atoms; $R^3$ is H, or a linear aliphatic hydrocarbon radical having from about 1 to 4 carbon atoms; x is an integer having an average value from 1 to about 30; further wherein $R^2$ can optionally be alkoxylated, wherein said alkoxy group is selected from the group consisting of ethoxy, propoxy, butoxy and mixtures thereof; said process comprising the steps of:

(a) providing a glycidyl ether having the formula:

$$R^2O\diagdown\!\!\!\!\triangle\!\!\!\!O$$

wherein $R^2$ is defined as above;
(b) providing an ethoxylated alcohol having the formula:

$$R^1O{\left[CH_2CH(R^3)O\right]}_xH$$

wherein $R^1$, $R^3$ and x are defined as above;
(c) reacting said glycidyl ether with said ethoxylated alcohol to form said surfactant in the presence of a basic catalyst;
(d) said surfactant is sparged with an inert gas; and
(e) said surfactant is bleached with an about 0.05% to about 5.0% by weight solution of a bleach at a temperature from about 25° C. to about 95° C.

2. The process as claimed in claim 1 wherein when x is about 2 or greater, $R^3$ may be the same or different.

3. The process as claimed in claim 1 wherein when x is about 15 or greater and when $R^3$ is selected from H and methyl, then at least four of the $R^3$ groups are methyl radicals; further wherein when x is about 15 or greater and when $R^3$ is selected from H and from 1 to 3 methyl groups, then at least one $R^3$ is ethyl, propyl or butyl.

4. The process as claimed in claim 1 wherein $R^1$ and $R^2$ are a linear or branched, saturated or unsaturated, aliphatic hydrocarbon radical having from about 6 to about 22 carbon atoms.

5. The process as claimed in claim 1 wherein x is an integer having an average value of from about 6 to about 15.

6. The process as claimed in claim 1 wherein said basic catalyst is a Lewis base selected from the group consisting of KOH, KOCH₃, NaOCH₃, NaOC₂H₅, Na, KO′Bu, NaOH, and mixtures thereof.

7. The process as claimed in claim 1 wherein said surfactant is sparged with an inert gas, under vacuum in the range of 5 to 500 mmHg.

8. The process as claimed in claim 1 wherein said catalyst is an alkali metal alkoxylate catalyst and said step of reacting glycidyl ether with ethoxylated alcohol is conducted at a temperature of from about 90° C. to about 140° C.

9. The process as claimed in claim 8 wherein said temperature ranges from about 100° C. to about 120° C.

10. The process as claimed in claim 1 wherein said step of providing said glycidyl ether further comprises the step of reacting a linear or branched, aliphatic or aromatic alcohol having the formula $R^2OH$ and an epoxide having the formula:

$$X\text{—CH}_2\text{—CH(O)CH}_2$$

wherein $R^2$ is defined as above and X is a leaving group.

11. The process as claimed in claim 1 wherein said catalyst is an alkali metal alkoxylates catalyst and said catalyst is employed at levels of from about 2.0 mol % to about 20.0 mol %.

12. The process as claimed in claim 10 wherein said step of reacting a linear alcohol with an epoxide is conducted in the absence of a solvent.

13. The process as claimed in claim 10 wherein said step of reacting a linear alcohol with an epoxide is conducted at about 40° C. to about 90° C.

14. A process for preparing an ether-capped poly (oxyalkylated) alcohol having the formula $$R^1O[CH_2CH(R^3)O]_xCH_2CH(OH)CH_2OR^2$$

wherein $R^1$ and $R^2$ are linear or branched, saturated or unsaturated, aliphatic or aromatic hydrocarbon radicals having from 1 to about 30 carbon atoms; $R^3$ is H, or a linear aliphatic hydrocarbon radical having from 1 to about 4 carbon atoms; x is an integer having an average value from about 6 to about 15; further wherein $R^2$ can optionally be alkoxylated, wherein said alkoxy group is selected from the group consisting of ethoxy, propoxy, butoxy and mixtures thereof; said process comprising the steps of:

(a) forming a glycidyl ether having the formula:

$$R^2O\text{—CH}_2\text{—CH(O)CH}_2$$

wherein $R^2$ is defined as above by reacting a linear or branched, aliphatic or aromatic alcohol having the formula $R^2OH$ and an epoxide having the formula:

$$X\text{—CH}_2\text{—CH(O)CH}_2$$

wherein $R^2$ is defined as above and X is a leaving group;

(b) providing an ethoxylated alcohol having the formula:

$$R^1\text{—O—CH(R}^3\text{)—(O)}_x\text{H}$$

wherein $R^1$, $R^3$ and x are defined as above; and (c) reacting said glycidyl ether with said ethoxylated alcohol to form said surfactant in the presence of a basic catalyst;

(d) optionally said surfactant is sparged with an inert gas and (e) said surfactant is bleached with an about 0.05% to about 5.0% by weight solution of a bleach at a temperature from about 25° C. to about 95° C.

15. The process as claimed in claim 1 wherein when x is about 6 or greater, $R^3$ may be the same or different.

16. The process as claimed in claim 1 wherein when x is about 15 and when $R^3$ is selected from H and methyl, then at least four of the $R^3$ groups are methyl radicals; further wherein when x is about 15 and when $R^3$ is selected from H and from 1 to 3 methyl groups, then at least one $R^3$ is ethyl, propyl or butyl.

17. The process as claimed in claim 14 wherein said step of reacting glycidyl ether with ethoxylated alcohol is conducted at a temperature of from about 50° C. to about 95° C.

18. The process as claimed in claim 14 wherein said basic catalyst is a Lewis base selected from the group consisting of KOH, NaOCH₃, NaOCH₃, NaOC₂H₅, Na, KO′Bu, NaOH and mixtures thereof.

19. The process as claimed in claim 14 wherein said catalyst is an alkali metal alkoxylates catalyst and said catalyst is employed at levels of from about 2.0 mol % to about 20.0 mol %.

20. The process as claimed in claim 6 wherein said catalyst is selected from the group consisting of KOH, NaOH and mixtures thereof; and wherein said step (c) further comprises less than about 5% by weight of water.

21. The process as claimed in claim 18 wherein said catalyst is selected from the group consisting of KOH, NaOH and mixtures thereof; and wherein said step (c) further comprises less than about 5% by weight of water.

* * * * *